(12) United States Patent
Joudon (10) Patent No.: US 12,173,725 B2
(45) Date of Patent: Dec. 24, 2024

(54) BLADE COMPRISING A STRUCTURE MADE OF COMPOSITE MATERIAL AND ASSOCIATED MANUFACTURING METHOD

(71) Applicant: Safran Aircraft Engines, Paris (FR)

(72) Inventor: Vincent Joudon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/278,999

(22) PCT Filed: Feb. 24, 2022

(86) PCT No.: PCT/FR2022/050339
§ 371 (c)(1),
(2) Date: Aug. 25, 2023

(87) PCT Pub. No.: WO2022/184997
PCT Pub. Date: Sep. 9, 2022

(65) Prior Publication Data
US 2024/0141917 A1    May 2, 2024

(30) Foreign Application Priority Data
Mar. 1, 2021 (FR) ..................... 2101966

(51) Int. Cl.
*F04D 29/38* (2006.01)
*B29C 70/24* (2006.01)
(Continued)

(52) U.S. Cl.
CPC ............ *F04D 29/388* (2013.01); *B29C 70/24* (2013.01); *B29C 70/443* (2013.01); *F04D 29/023* (2013.01); *B29L 2031/082* (2013.01)

(58) Field of Classification Search
CPC . F01D 5/14; F01D 5/147; F01D 5/282; F01D 7/00; F04D 29/388; F04D 29/023;
(Continued)

(56) References Cited

U.S. PATENT DOCUMENTS 2,235,605 A * 3/1941 Bugatti ............... B64C 11/12
403/372
3,950,115 A    4/1976 Euler
(Continued)

FOREIGN PATENT DOCUMENTS

EP    2 588 758 B1    4/2016
FR    2 252 916 A1    6/1975
(Continued)

OTHER PUBLICATIONS

French Search Report for French Application No. FR2101966, dated Nov. 29, 2021.
(Continued)

*Primary Examiner* — Courtney D Heinle
*Assistant Examiner* — Ryan C Clark
(74) *Attorney, Agent, or Firm* — Birch, Stewart, Kolasch & Birch, LLP (57) ABSTRACT

The present invention relates to a blade comprising: a structure of aerodynamic profile comprising two mutually opposite skins; and a spar comprising a fibrous reinforcement obtained by three-dimensional weaving and densified by the matrix, the spar comprising a blade root portion extending outside the structure of aerodynamic profile and an airfoil portion arranged inside the structure of aerodynamic profile between the two skins. Moreover, within the blade root portion, the fibrous reinforcement of the spar comprises a non-debound region and at least two debound regions extending radially from the non-debound region so as to form at least four separate branches.

17 Claims, 9 Drawing Sheets

(51) Int. Cl.
*B29C 70/44* (2006.01)
*B29L 31/08* (2006.01)
*F04D 29/02* (2006.01)

(58) Field of Classification Search
CPC ..... B29C 70/24; B29C 70/222; B29C 70/443; B64C 11/04; B64C 11/06; B64C 11/08; B64C 11/12; B64C 11/26; B29L 2031/08; B29L 2031/082; B29L 2031/085; B29L 2031/087; F05D 2220/36; F05D 2300/601; F05D 2300/6012; F05D 2300/603; F05D 2300/6034
See application file for complete search history.

(56) References Cited

U.S. PATENT DOCUMENTS

| | | | | |
|---|---|---|---|---|
| 4,045,149 | A * | 8/1977 | Ravenhall | F01D 5/282 |
| | | | | 416/135 |
| 5,458,465 | A * | 10/1995 | von Wieser | F04D 29/38 |
| | | | | 416/214 R |
| 9,162,750 | B2 | 10/2015 | Coupe et al. | |
| 9,616,629 | B2 | 4/2017 | Fabre et al. | |
| 11,131,197 | B2 | 9/2021 | Courtier et al. | |
| 11,560,800 | B1 * | 1/2023 | Kim | F01D 5/284 |
| 2002/0008177 | A1 * | 1/2002 | Violette | B64C 11/04 |
| | | | | 244/123.1 |
| 2006/0275132 | A1 * | 12/2006 | McMillan | B29C 70/865 |
| | | | | 442/205 |
| 2009/0035131 | A1 * | 2/2009 | McMillan | F04D 29/324 |
| | | | | 415/200 |
| 2009/0072439 | A1 * | 3/2009 | Karem | B29D 99/0028 |
| | | | | 264/258 |
| 2013/0142660 | A1 * | 6/2013 | McCaffrey | F01D 5/18 |
| | | | | 29/889.7 |
| 2015/0315920 | A1 * | 11/2015 | Illand | B29D 99/0025 |
| | | | | 416/230 |
| 2016/0265548 | A1 * | 9/2016 | Weisse | F04D 29/023 |
| 2019/0217943 | A1 | 7/2019 | Courtier | |
| 2019/0323357 | A1 * | 10/2019 | Courtier | B64C 11/30 |
| 2020/0223531 | A1 * | 7/2020 | Courtier | D03D 25/005 |
| 2020/0232332 | A1 * | 7/2020 | Farrar | F04D 29/54 |
| 2022/0097824 | A1 * | 3/2022 | Courtier | F01D 5/282 |
| 2022/0266977 | A1 * | 8/2022 | Liles | B32B 18/00 |
| 2022/0372882 | A1 * | 11/2022 | Marchal | F01D 5/282 |
| 2022/0403748 | A1 * | 12/2022 | Marchal | F01D 5/147 |
| 2023/0313692 | A1 * | 10/2023 | Kim | F01D 5/282 |
| | | | | 415/200 |

FOREIGN PATENT DOCUMENTS

| | | |
|---|---|---|
| FR | 3 076 814 A1 | 7/2019 |
| FR | 3 080 322 A1 | 10/2019 |
| WO | WO 2011/083250 A1 | 7/2011 |

OTHER PUBLICATIONS

International Search Report and Written Opinion of the International Searching Authority for International Application No. PCT/FR2022/050339, dated Apr. 26, 2022.

* cited by examiner

BLADE COMPRISING A STRUCTURE MADE OF COMPOSITE MATERIAL AND ASSOCIATED MANUFACTURING METHOD

TECHNICAL FIELD

The disclosure relates to a blade comprising a structure made of composite material.

The disclosure more particularly, but not exclusively, relates to a blade intended to be used in an unducted aircraft engine fan (such as an engine of "Open Rotor" type, i.e. with a fan that is not ducted, having two rotary propellers or an engine of USF (Unducted Single Fan) type having movable blades and fixed vanes or a turboprop engine having an architecture with a single propeller or in a wind turbine rotor.

BACKGROUND

The design of fan blades requires conflicting limiting factors to be taken into account.

On the one hand, the dimensioning of these blades must allow optimum aerodynamic performance (maximize efficiency and provide thrust while minimizing losses). Since the improvement of the aerodynamic performance of the fan tends to increase the expansion ratio (BPR), this manifests as an increase in the outer diameter, and therefore in the span of these blades.

On the other hand, it is also necessary to guarantee resistance to the mechanical limitations which can apply to these blades while also limiting their acoustic signature.

The benefit of engines with unducted fans is that the diameter of the fan is not limited by the presence of a duct, so that it is possible to design an engine with a high expansion ratio, and consequently a reduced fuel consumption.

Thus, in this type of engine, the blades of the fan may have a large span.

Provision has been made for making these blades out of metallic material. Although blades made of metallic material have good mechanical resistance, they have the drawback of having a relatively high mass.

To reduce this mass, it is desirable to be able to manufacture these blades out of composite material.

In addition, these engines generally comprise a mechanism making it possible to modify the setting angle of the blades in order to adapt the thrust generated by the fan according to of the different flight phases.

Moreover, on unducted fan architectures, the starting of the engine is generally done "feathered" with a very open setting. This is because a very open setting makes it possible to consume power via the torque, which ensures machine safety while guaranteeing low fan ratings.

However, with a very open setting, the blades undergo turbulent aerodynamic flow, which generates a wideband vibrational excitation. Particularly on blades with wide chords and large spans, the bending force is intense, even though the engine rating is not at a maximum.

To avoid this situation of swirl at start-up or in a "windmilling" situation, provision has notably been made in the document FR3080322 for producing a blade made of composite material comprising a blade root part inserted into a blade root fastening piece. The blade root part comprises two portions obtained by making a non-interlinking in the fiber reinforcement and an angle-shaped locking part positioned such as to keep the two portions apart from one another to oppose the withdrawal of the blade root part from the fastening piece.

However, the intense aerodynamic forces to which these blades are subjected risk damaging the blade at the stilt connecting the root to the blade and/or the hub in the interface area between these blades and the hub of the fan rotor. Specifically, an intense vibrational excitation may also occur at much higher rotation ratings than on unducted architectures because of the effects of installation of the engine on the aircraft and because of the direction of the infinite upstream flow. Specifically, an unducted engine undergoes the influence of the ground and of the fuselage which causes a distortion in the supply to the propeller, at flow speed, along the engine azimuths. This leads to a vibrational response of the blades, particularly on the first engine orders 1N, 2N and 3N. Additionally, in the absence of an air intake duct, the direction of the air flowing through the blades is not parallel to the engine axis. This angle of skid causes so-called "1P" forces which cause a vibrational response of the blades on the engine order 1N. Similarly, these 1P forces can also appear during climb or approach phases of the aircraft since the air flows through the airfoils with an angle of incidence.

SUMMARY

An aim of the disclosure is to make provision for a blade comprising a composite material suitable for being used with a variable setting mechanism in an "Open Rotor" type environment which limits or even eliminates the risks of swiveling of the blade during all the flight phases which are liable to excite the vibrational modes of the blade, even in the case of a blade having a wide chord and a large span.

Another aim of the disclosure is to make provision for a blade comprising a composite material suitable for being used with a variable setting mechanism and in an environment of "Open Rotor" type while being capable of resisting intense aerodynamic forces, under the restriction of a limited bulk and a minimal mass.

Yet another aim of the disclosure is to make provision for a blade comprising a composite material suitable for being used with a variable setting mechanism and in an environment of "Open Rotor" type, for which the hub ratio is reduced by comparison with the composite material blades of the prior art while being capable of resisting intense aerodynamic forces.

Another aim is to make provision for a blade comprising a composite material suitable for being used with a variable setting mechanism and in an environment of "Open Rotor" type which can be produced simply and quickly, without requiring a large number of operations.

For this purpose provision is made, according to a first aspect, for a blade comprising a structure made of composite material comprising:
- an aerodynamic profile structure comprising two skins facing one another, the skins comprising a first fiber reinforcement densified by a matrix; and
- a spar comprising a second fiber reinforcement obtained by three-dimensional weaving and densified by the matrix, said spar comprising a blade root part extending outside the aerodynamic profile structure and an airfoil part disposed inside the aerodynamic profile structure between the two skins.

In addition, within the blade root part, the second fiber reinforcement comprises an interlinked area and at least two non-interlinked areas extending radially from the interlinked area such as to form at least four distinct branches.

It will be noted that the matrix can be injected into the first and the second fiber reinforcement during one and the same step or during two successive steps.

Some preferred but non-limiting features of the blade according to the first aspect are as follows, taken individually or in combination:

- within the blade root part, the branches of the non-interlinked area are globally contained in a circle centered on an axis of setting of the blade;
- within the blade root part, a free end of the branches is substantially rounded such as to follow a curvature of the circle or straight line;
- the blade further comprises a fastening piece comprising a wall delimiting a cavity configured to at least partly receive the blade root part, the fastening piece being able to be metallic and the wall of the fastening piece comprising at least four depressions configured to each receive, with adjustment, a branch of the second fiber reinforcement;
- in a portion of the blade root part which protrudes from the fastening piece, a diameter of the circle decreases in the direction of the airfoil part;
- within the blade root part, the interlinked area has a first dimension, along an axis substantially parallel to a chord of the blade, which is constant over a height of the blade root part;
- within the blade root part, the interlinked area has a second dimension, along a tangential axis which is substantially perpendicular to a chord of the blade, which is constant over a height of the blade root part;
- the airfoil part has a lower portion adjacent to the blade root part, the non-interlinked area and the interlinked area of the second fiber reinforcement extending all the way into the lower portion, the blade further comprising at least two filling pieces made of a material including inner cavities, each filling piece being mounted within a corresponding non-interlinked area;
- the interlinked area has a first dimension, along an axis substantially parallel to a chord of the blade, which is greater in the lower portion of the airfoil part than in the blade root part;
- the first dimension gradually increases within the lower portion of the airfoil part in the direction of a tip of the blade;
- within the lower portion of the airfoil part, the interlinked area has a second dimension, along a tangential axis which is substantially perpendicular to a chord of the blade, which decreases in the direction of a tip of the blade;
- the lower portion of the airfoil part further comprises at least two additional filling pieces made of a material including inner cavities, each additional filling piece being mounted between the interlinked area and a corresponding skin;
- the interlinked areas within the airfoil part extend all the way to a part of the skins which defines a leading edge and/or a trailing edge of the blade;
- the airfoil part furthermore has an upper portion comprising the blade tip, the upper portion of the airfoil part further comprising at least one additional filling piece made of a material including inner cavities, the upper portion of the airfoil part being devoid of any second fiber reinforcement; and/or
- the airfoil part furthermore has an upper portion comprising the blade tip, the upper portion of the airfoil part solely comprising the second fiber reinforcement.

According to a second aspect, it is provided a method for manufacturing a blade according to the first aspect comprising the following steps:

S1: three-dimensional weaving of the second fiber reinforcement of the spar comprising at least two non-interlinked areas and the interlinked area;

S2: producing the first fiber reinforcement of the aerodynamic profile structure, for example by three-dimensional weaving;

S4: inserting the second fiber reinforcement into the first fiber reinforcement such that the blade root part is located on the outside of the first fiber reinforcement and the airfoil part is located inside the first fiber reinforcement; and S5: placing the assembly formed by the first fiber reinforcement and the second fiber reinforcement into a mold and injecting a matrix into the assembly such as to obtain the blade.

Some preferred but non-limiting features of the manufacturing method according to the second aspect are as follows, taken individually or in combination:

- the method further comprises, prior to the step S4, a step of positioning at least one filling piece made of a material including inner cavities with respect to the first fiber reinforcement; and/or
- the method further comprises, following the step S6, a step of attaching a fastening piece onto the blade root part.

According to a third aspect, it is provided a gas turbine engine for an aircraft comprising a fan, the fan comprising a hub and blades extending radially from the hub, the blades being in accordance with the first aspect, each blade being mounted rotatably with respect to the hub about a respective axis of setting, the engine further comprising an actuating mechanism of its own able to be controlled to make the blades turn about their axes of setting in such a way as to modify the angle of setting of the blades.

According to a fourth aspect, it is provided an aircraft comprising a gas turbine engine according to the second aspect.

DESCRIPTION OF THE FIGURES

Other features, aims and advantages will become apparent from the following description, which is purely illustrative and non-limiting, and which must be read with reference to the appended drawings, wherein.

In all the figures, similar elements bear identical reference numbers.

DETAILED DESCRIPTION

Figure 1:
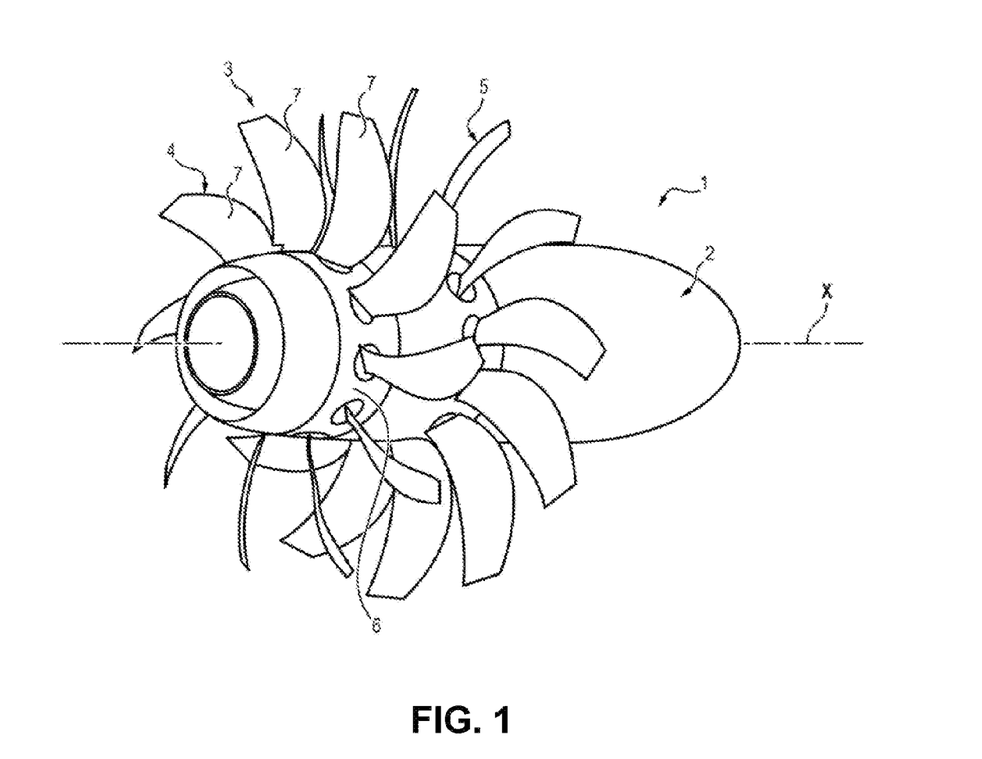
FIG. 1 schematically represents an example of an engine including an unducted fan.

In FIG. 1, the engine 1 shown is an engine of "Open Rotor" type, in a configuration currently known as "pusher" (i.e. the unducted fan is placed aft of the power generator with an air inlet located on the side, on the right in FIG. 1).

The engine comprises a nacelle 2 intended to be attached to a fuselage of an aircraft, and an unducted fan 3 (or propeller). The fan 3 comprises two contra-rotating fan rotors 4 and 5. In other words, when the engine 1 is in operation, the rotors 4 and 5 are rotationally driven with respect to the nacelle 2 about one and the same axis of rotation X (which coincides with a centerline of the engine), in opposite directions.

In the example illustrated in FIG. 1, the engine 1 is an engine of "Open Rotor" type in pusher configuration with contra-rotating fan rotors. However, the disclosure is not limited to this configuration. The disclosure is also applicable to engines of "Open Rotor" type in "puller" configuration (i.e. the fan is placed upstream of the power generator with an air inlet located in front of, between or just behind the two fan rotors).

Furthermore, the disclosure is also applicable to engines having different architectures, such as an architecture comprising a fan rotor comprising movable blades and a fan stator comprising fixed vanes, or else a single fan rotor.

The disclosure is applicable to architectures of turboprop type (comprising a single fan rotor), and also to wind turbine rotors.

In this application, the term "axis X" is used to refer to the axis of rotation of the fan rotor (or of the propeller). The axial direction corresponds to the direction of the axis X and a radial direction is a direction perpendicular to this axis X and passing through it. Moreover, the circumferential (or tangential) direction corresponds to a direction perpendicular to the axis X and not passing through it.

The blade will thus be defined with respect to the axis X of the rotor on which it is intended to be mounted. Finally, a given section of the blade (and therefore a given point on the stacking axis Z)" will be understood to mean the substantially axial line segment connecting the leading edge to the trailing edge of the blade.

In FIG. 1, each fan rotor 4, 5 comprises a hub 6 (or blading hub) mounted rotatably with respect to the nacelle 2 and a plurality of blades 7 attached to the hub 6. The blades 7 extend substantially radially with respect to the axis X of rotation of the rotor.

Figure 2:
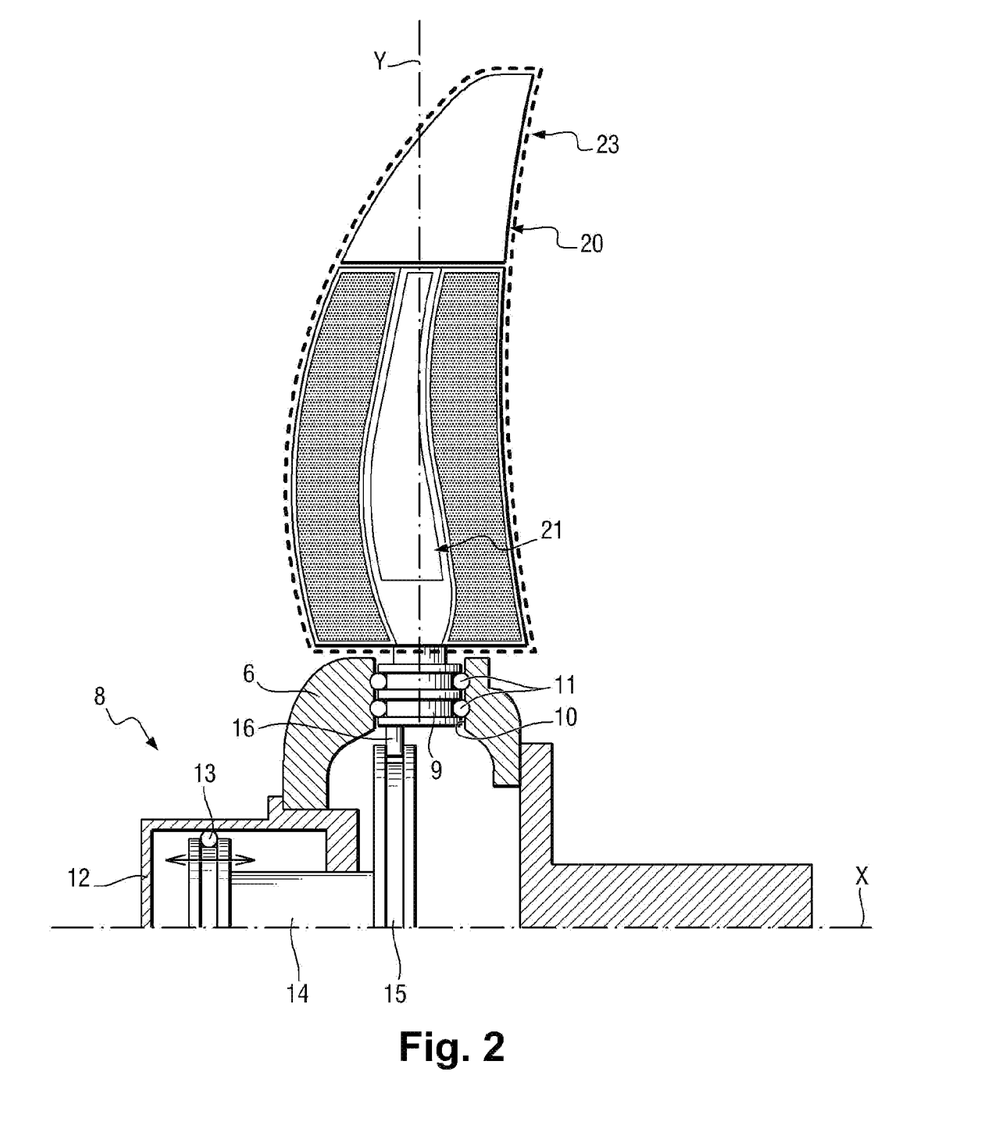
FIG. 2 schematically represents a fan blade and an actuating mechanism making it possible to modify the angle of setting of the blades of the fan.

As illustrated in FIG. 2, the fan 3 further comprises an actuating mechanism 8 making it possible to collectively modify the angle of setting of the blades 7 of the rotors, in order to adapt the performance of the engine to the different flight phases. For this purpose, each blade 7 comprises a fastening piece 9 (or blade hub) disposed at the blade root 7. The fastening piece 9 is mounted rotatably with respect to the hub 6 about an angle of setting Y. More precisely, the fastening piece 9 is mounted rotatably inside a housing 10 fashioned in the hub 6, by way of balls 11 or other rolling elements.

The fastening piece 9 comprises a wall having an outer surface having a revolution shape. The outer surface has two circular grooves of its own suitable for forming rolling paths for ball bearings or other rolling elements.

The actuating mechanism 8 for example comprises an actuator 12 comprising a body 13 attached to the hub 6 and a rod 14 suitable for being translationally driven with respect to the body 12. The actuating mechanism 8 further comprises an annular slide 15 mounted as a single part with the rod 14 and a pin 16 mounted as a single part with the fastening piece 9. The pin 16 is suitable for sliding in the slider 15 and for turning with respect to the slider 15, in such a way as to convert a movement of translation of the rod 14 into a movement of rotation of the fastening piece 9, and consequently a movement of rotation of the blade 7 with respect to the hub 6 about its axis of setting Y.

The blade 7 comprises an aerodynamic profile structure 20 suitable for being placed in an air stream when the engine 1 is in operation in order to generate a lift, as well as a spar 21.

The aerodynamic profile structure 20 comprises two skins 22, which are connected to one another and extend globally opposite one another. The skins 22 are shaped such as to define together a pressure face I, a suction face E, a leading edge 18 and a trailing edge 19. In a manner known per se, the leading edge 18 is configured to extend facing the flow of gas entering the engine 1. It corresponds to the forward part of an aerodynamic profile which faces the air stream and which divides the air flow into a pressure face flow and a suction face flow. The trailing edge 19 meanwhile corresponds to the back part of the aerodynamic profile, where the pressure face and suction face flows meet.

The skins 22 of the aerodynamic profile structure 20 are made of a composite material comprising a fiber reinforcement (hereinafter, the skin reinforcement 23) densified by a matrix. They are therefore monolithic and are made as a single part according to a non-limiting embodiment. In a variant not shown, it is possible to consider one fiber reinforcement for the pressure face and another for the suction face.

The spar 21 comprises a blade root part 24 which extends outside the aerodynamic profile structure 20 and an airfoil part 25 which is disposed inside the aerodynamic profile structure 20, between the two skins 22. It also comprises a fiber reinforcement (hereinafter, the spar reinforcement 26) which is obtained by three-dimensional weaving and is densified by a matrix: the blade root part 24 and the airfoil part 25 are therefore monolithic and made as a single part.

The skin 23 and spar reinforcement 26 can each be formed based on fiber preforms made as a single part with a varying thickness. Each matrix typically comprises an organic material (thermosetting, thermoplastic or elastomer) or a carbon matrix. For example, each matrix comprises a plastic material, typically a polymer, for example epoxide, bismaleimide or polyimide. The fibers of the fiber reinforcement comprise at least one of the following materials: carbon, glass, aramid, polypropylene and/or ceramic. The matrix and the fibers of the composite materials forming the skin reinforcement 23 and the spar reinforcement 26 may be identical or different. Preferably, they are identical.

The spar reinforcement 26 comprises three-dimensionally woven fiber reinforcements. It is moreover woven such that it comprises warp threads which extend continuously once inside the airfoil part 25 with an aerodynamic profile and inside the blade root part 24.

The skin reinforcement 23 may comprise woven fiber arrangements (two-dimensional or three-dimensional), braided, knitted or laminate.

In order to limit, or even eliminate, the risks of swiveling of the blade 7 during all the flight phases which are liable to excite the vibrational modes of the blade 7, even in the case of a blade 7 having a wide chord and a large span, the spar reinforcement 26 within the blade root part 24 comprises an interlinked area 27 and at least two non-interlinked areas 28 which extend radially from the interlinked area 27 such as to form at least four distinct branches 29 (each non-interlinked area 28 of the fiber reinforcement embodying two branches 29). When the spar reinforcement 26 comprises exactly two non-interlinked areas 28, the blade root part 24 therefore has, in a plane normal to the axis of setting Y (which is globally tangential with respect to the axis X), a cross-shaped section, the heart of the cross being formed by the interlinked area 27. Note, however, that this is in no way limiting, the spar reinforcement 26 being able to comprise a greater number of non-interlinked areas 28 (in the plane of the spar reinforcement 26 (along the axis of setting Y) or in the thickness of the spar reinforcement 26) defining a greater number of branches 29.

Figure 6A:
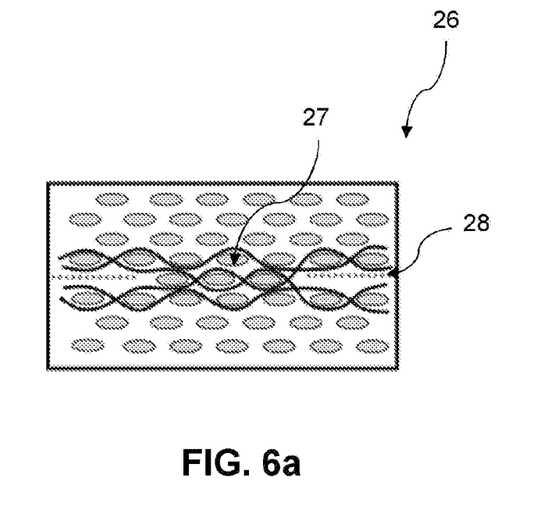
FIG. 6a is a schematic view illustrating the production of two non-interlinkings in a fiber preform, on either side of an interlinked area according to an embodiment.
Figure 6B:
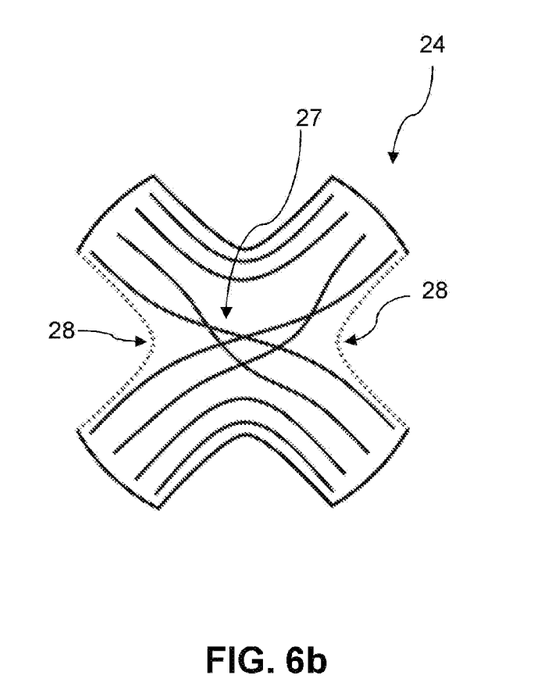
FIG. 6b is a schematic view of a section of the blade root part of FIG. 3 between the sections A-A and B-B.

The term "non-interlinked area" 28 should here be understood to mean, during the weaving of the spar reinforcement 26, a non-interlinking is made inside the fiber blank between two successive warp layers from the interlinked area 27 (which is devoid of any non-interlinkings, or at least any through non-interlinkings) all the way to the end 30 of the branches 29 such as to form the non-interlinked area 28 of the spar reinforcement 26. In particular, as illustrated in FIGS. 6a and 6b, the warp tows of the two successive layers are not linked by weft tows at the level of the non-interlinked area 28, thus forming the (central) interlinked area 27 and the four "non-interlinked" branches 29 that can be opened to form the cross. Each non-interlinked area 28 thus makes it possible to separate the fiber reinforcement into two portions intended to each form one branch 29. By way of example the reader is referred to the document EP2588758 in the name of the Applicant for more details on the production of non-interlinkings.

This configuration with at least four branches 29 of the blade root part 24 ensures the take-up of the mechanical actions resulting from the aerodynamic and centrifugal forces applied to the full blade 7 while allowing a variable setting of the blade 7.

Preferably, the interlinked area 27 is globally centered in the middle of the chord of the blade, at any point of the height of the blade 7. However, it can also be beneficial to center this interlinked area 27 on the axis of setting Y or in any other stacking sequence.

In an embodiment, the wall of the fastening piece 9 delimits a cavity configured to house the blade root part 24 of the spar 21. The wall is of a complementary shape to the blade root part 24 that it receives in order to receive it with adjustment and tightening. In the illustrated configuration where the blade root part 24 is in the shape of a cross, the cavity therefore has four depressions, the dimensions of which (in a plane radial to the axis of setting Y and along the axis of setting Y) are substantially equal to those of the branches 29 of the blade root part 24.

The fastening piece 9 is shaped out of metal, for example martensitic steel.

In an embodiment, within the blade root part 24, the branches 29 defined by the non-interlinked areas 28 are globally contained in a circle C centered on the axis of setting Y of the blade 7. The term "contained in a circle C" should here be understood to mean that the free end 30 of the branches 29 intersects the circle C at at least one point. The interlinked area 27 is preferably centered with respect to the circle C such that the length of the branches 29 (along a radial direction passing through the center of the circle C) is substantially equal.

Optionally, the free end 30 of the branches 29 is substantially curved and can follow the curvature of the circle C. The free end 30 of the branches 29 therefore intersects the circle C along a line. In a variant, the free end 30 of the branches 29 may be straight or have any other suitable shape.

Figure 3:
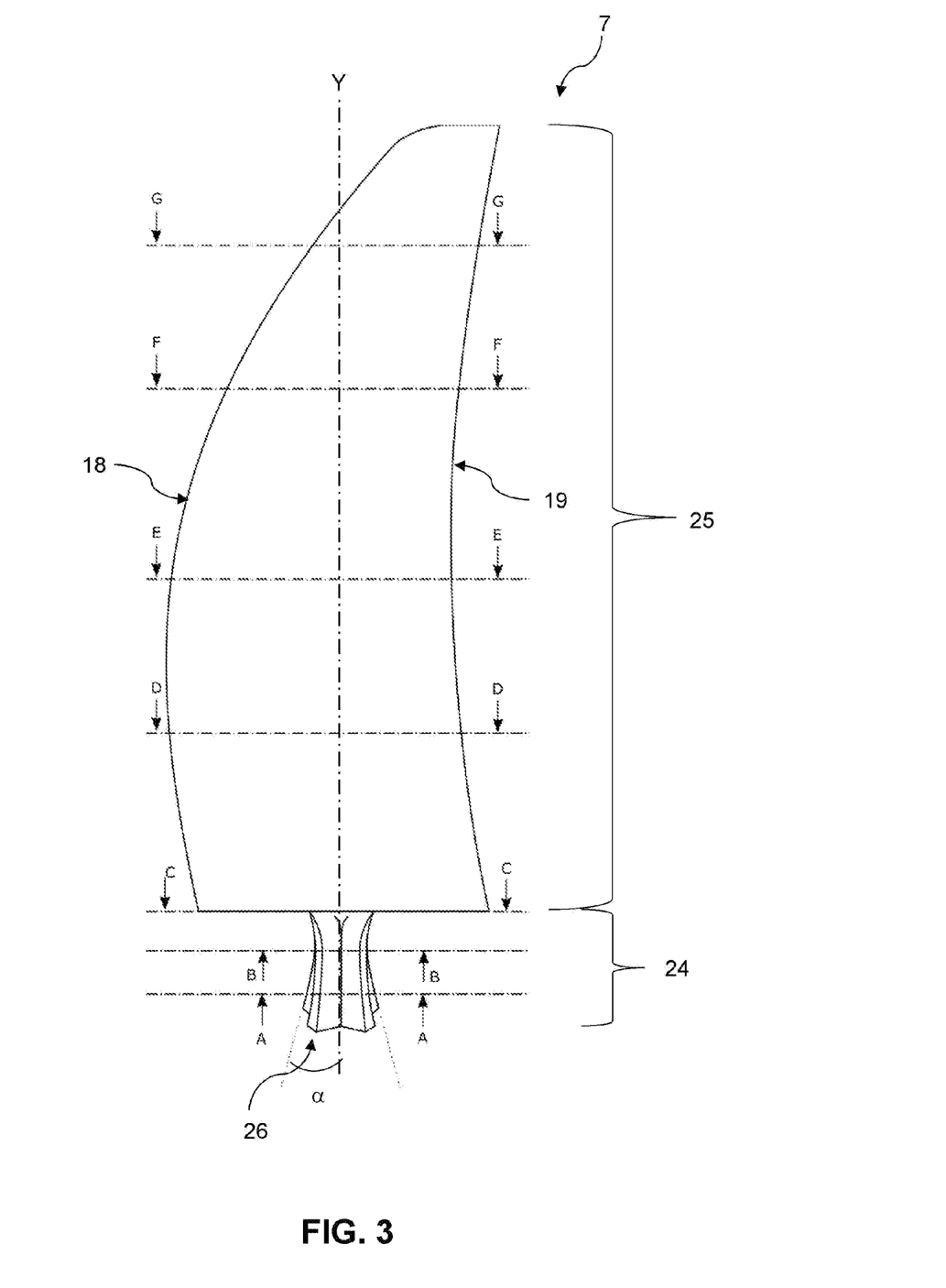
FIG. 3 is a side view of an exemplary embodiment of a blade in accordance with an embodiment.

An example of a blade 7 in accordance with an embodiment is illustrated in FIG. 3. Here, the spar reinforcement 26 comprises two non-interlinked areas 28: this is however not limiting, as indicated above. Sections A-A, B-B, . . . , G-G, each taken in a plane normal to the axis of setting Y of the blade 7 are illustrated in FIGS. 4a to 4f, which correspond to a first embodiment, and in FIGS. 5a to 5d, which correspond to a second embodiment. The sections A-A, B-B, etc. are each embodied at a different height of the blade 7.

Figure 4A:
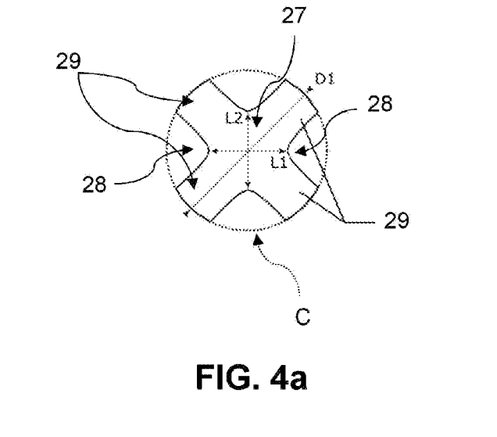
FIG. 4a is a section view along the section A-A of FIG. 3 according to a first embodiment.

The section A-A intersects a lower part of the blade root part 24 which is configured to be housed in the fastening piece 9. In the blade root part 24, the spar reinforcement 26 comprises the interlinked area 27 and the two non-interlinked areas 28 together forming a cross comprising four branches 29. The free end 30 of the branches 29 is rounded such that the cross is contained in the circle C in the strict sense.

Figure 4B:
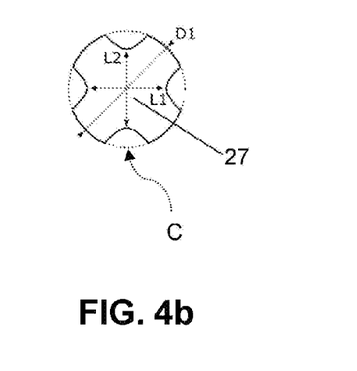
FIG. 4b is a section view along the section B-B of FIG. 3 according to the first embodiment.

The section B-B intersects the blade root part 24 at the level of the exit of the fastening piece 9, i.e. at the level of the opening of the fastening piece 9 through which the blade root part 24 protrudes from the fastening piece 9. This section B-B thus marks the end of the embedding of the blade root part 24.

In an embodiment, the diameter of the circle C in the section B-B is less than the diameter of the circle C in the section A-A. In other words, the area of the section of the blade root part 24 which intersects the section B-B is less than that which intersects the section A-A. This specifically makes to possible to ensure the retainment of the blade root part 24 by restriction of the section inside the fastening piece 9. Preferably, the diameter of the circle C gradually decreases, optionally linearly, within the blade root part 24 in the direction of the airfoil part 25, i.e. from the section A-A in the direction of the section B-B.

The length L1 of the interlinked area 27 along the chord direction and the thickness L2 of the interlinked area 27 along a direction perpendicular to the chord direction (the length lengths L1 and the thickness L2 being both measured in a plane normal to the axis of setting Y) are preferably constant between the sections A-A and B-B. In other words, the length of the branches 29 decreases between the sections A-A and B-B whereas the interlinked area 27 remains unchanged. In this way, the interlinked area 27 is capable of taking up the centrifugal forces and the bending moments resulting from the aerodynamic forces on the surfaces located at the level of the free ends 30 of the branches 29, inclined at an angle α with respect to the axis of setting Y (where the angle α corresponds to the angle formed between the axis of setting and the radial surface of the blade root part 24 at the level of the end 30 of a branch 29—see FIG. 3). The composite material thus works in the weft direction and not in the out-of-plane direction, which is less stiff. Complementarily, the outer surfaces of the blade root part 24 which form the hollows between two adjacent branches 29 ensure the take-up of the torsion resulting from the aerodynamic forces applied to the blade 7. At the level of the section B-B, the centrifugal forces and the bending moments incur traction/compression stresses in the warp tows while the torsion incurs shear.

In a variant embodiment, the decrease in the area of the section of the blade root part 24 between the section B-B and the section A-A can be embodied by altering the length L1 and/or the thickness L2 and/or the thickness of the branches 29, which can be varying. In this case, the centrifugal forces are no longer taken up solely on the surfaces of the ends 30 of the branches 29 by compression of the weft tows but also on the other surfaces by out-of-plane compression of the branches 29 and/or of the interlinked area 27.

Whatever the variant embodiment, the branch configuration 29 (such as to form a cross or, where applicable, a star with at least six branches 29) of the blade root part 24 at the exit of the embedded part makes it possible to considerably increase the value of the quadratic moment with respect to a rectangular section contained inside a circle C of the same diameter. This specifically makes it possible to considerably reduce the stresses in the stilt area, i.e. the area of the blade root part 24 located between the exit of the fastening piece and the airfoil part 25), in particular in the case of a bend globally around the chord direction.

Figure 4C:
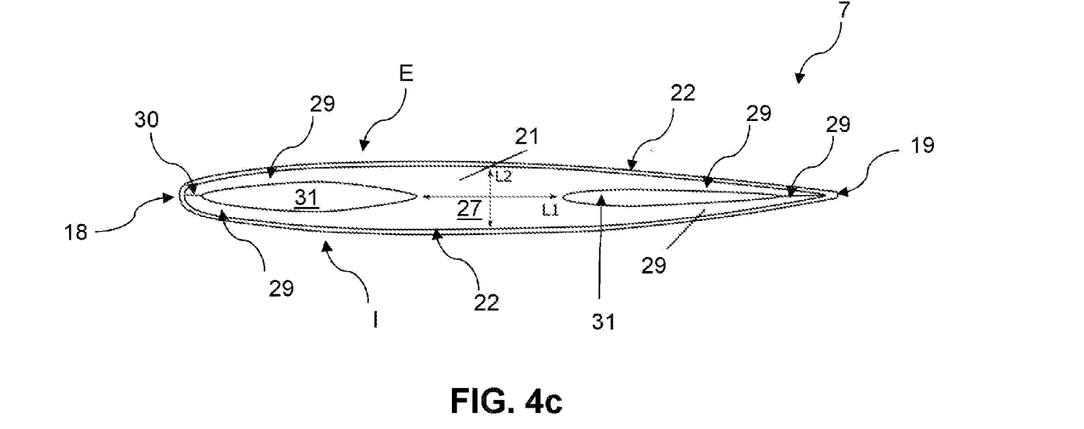
FIG. 4c is a section view along the section C-C of FIG. 3 according to the first embodiment.

The section C-C is located at the interface between the blade root part 24 and the airfoil part 25. The stilt of the blade 7 therefore extends from the section B-B to the section C-C and makes it possible to make the transition between the blade root part 24 and the airfoil part 25.

To limit the hub ratio, the height of the stilt is small. To do this, the thickness of the stilt is quickly decreased by closing the angle of the adjacent branches 29 at the level of the non-interlinked areas 28, from the section B-B to the section C-C. Optionally, the thickness L2 of the interlinked area 27 of the spar reinforcement 26 can also decrease. On the other hand, the length L1 of the interlinked area 27 increases to conserve a large enough section at the section C-C.

Advantageously, a small hub ratio leads to engine compactness and a gain in the mass of the fan. In particular, the smaller the diameter of the hub at the inner limit of the air flow path, the more aerodynamic working space is available for a given outer rotor blade diameter. Consequently, the transition in thickness of the blade 7 must be very quick in the area of the stilt. This makes it possible to correctly supply the low-pressure compressor (or booster) with an air intake duct and avoid the use of a remote sectoral duct.

This embodiment is simpler and makes it possible to achieve much higher thickness gradients than in conventional methods, were the variation in thickness is obtained by addition or removal of warp layers which must be woven over the entire length of the fiber reinforcement and cut in the area of the stilt since they are unused in this area, and is often limited by the stresses of the weaving method.

The airfoil part 25 comprises a lower portion adjacent to the blade root part 24, the lower radial limit of which is defined by the section C-C. The non-interlinked area 28 and the interlinked area 27 of the spar reinforcement 26 extend all the way into the airfoil part 25.

Moreover, the blade 7 further comprises at least two filling pieces 31 made of a material including inner cavities, each filling piece 31 being mounted within a corresponding non-interlinked area 28. The filling pieces 31 preferably have a low density, for example in the order of a hundred kg/m 3, and a stiffness in the order of a hundred MPa. The filling pieces 31 may particularly comprise a foam, such as a foam of organic origin (polymethacrylimide, polyethylene terephthalate (PET), polyvinyl chloride (PVC), polyetherimide (PEI), polyvinyl, carbon, polyisocyanurate, polyurethane, etc.) or metallic (particularly made of aluminum alloy), or else a honeycomb of Nomex® type (comprising aramid fibers calendered into leaves and covered in phenolic resin), made of Kevlar, fiber glass or else aluminum.

Preferably, the filling pieces 31 do not completely open onto the lower surface of the airfoil part 25 of the spar reinforcement 26 (i.e. the free surface of the airfoil part 25 which is adjacent to the stilt) in order to fashion a small space filled by the resin at the time of injection and thus ensuring the sealing of the cavities housing the filling pieces 31.

In an embodiment, the free ends 30 of the branches 29 meet pairwise respectively near the leading edge 18 and the trailing edge 19, thus trapping the filling pieces 31. Optionally, the non-interlinked parts of the spar reinforcement 26 extend respectively all the way to the leading edge 18 and to the trailing edge 19 of the blade 7.

Preferably, the outer surface of the spar reinforcement 26 is directly in contact with the skin 22 facing the airfoil part 25. Insofar as the skins 22 are placed at the surface of the blade 7 to protect it from impacts and erosion, the skins 22 of the aerodynamic profile structure 20 are preferably directly in contact along a large surface with the spar reinforcement 26 which forms the structural framework of the blade 7. The skin reinforcement 23 and the spar reinforcement 26 are then connected by cohesion of the resin at their interface, said cohesion being further improved when one and the same matrix is used for the densification of the spar reinforcement 26 and of the skin reinforcement 23. In a first form of embodiment illustrated in FIGS. 4c to 4e, the surface of the branches 29 formed by the non-interlinked areas 28 is in continuous contact with the skin reinforcement 23. In a variant, in a second form of embodiment illustrated in FIGS. 5a to 5d, only the branches 29 located near the trailing edge 19 are in continuous contact with the skin reinforcement 23, the branches 29 located near the leading edge 18 being in discontinuous contact with the skin reinforcement 23. More precisely, the branches 29 located near the leading edge 18 may be in contact with the skin reinforcement 23 plumb with the leading edge 18 as well as in the area adjacent to the interlinked area 27 but not between these two areas such that cavities are fashioned between the branches 29 and the skin reinforcement 23, on the leading edge 18 side. A filling piece 34 can then be housed in each cavity (see for example FIGS. 5a-5d), on either side of the free ends 30 on the leading edge 18 side.

In a variant, the cavities are fashioned on the trailing edge side 19, the branches 29 located near the leading edge 18 being in continuous contact or, in yet another variant, cavities are fashioned both on the trailing edge 19 and leading edge 18 side, these cavities then being filled by filling pieces 34.

Where applicable, it is possible that the free end 30 of the branches 29 are not in contact with the skin 22 plumb with the leading edge 18 and/or with the trailing edge 19, a filling piece then being also inserted between the leading edge 18 and/or the trailing edge 19 and the free end 30 of the branches 29.

Figure 4D:
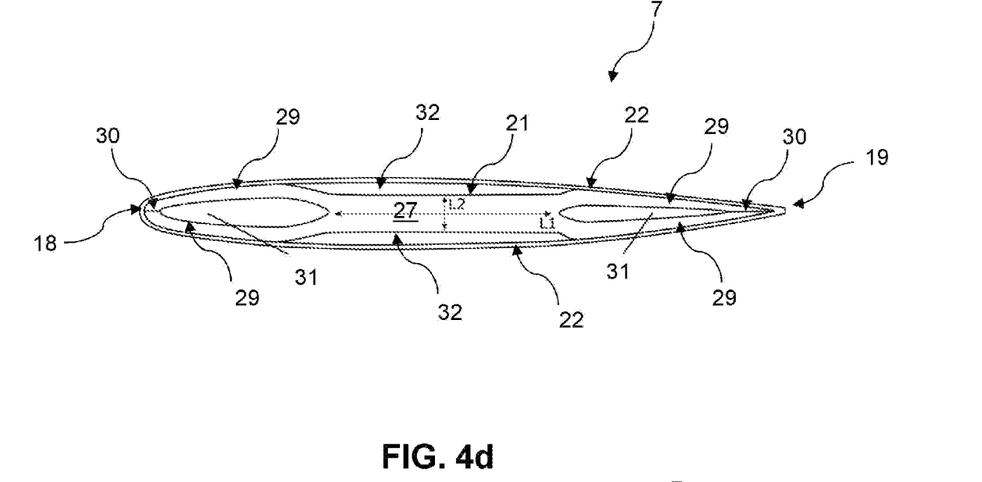
FIG. 4d is a section view along the section D-D of FIG. 3 according to the first embodiment.
Figure 4E:
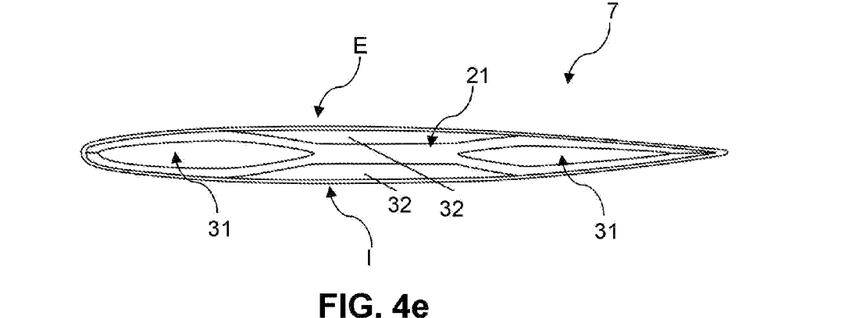
FIG. 4e is a section view along the section E-E of FIG. 3 according to the first embodiment.
Figure 4F:
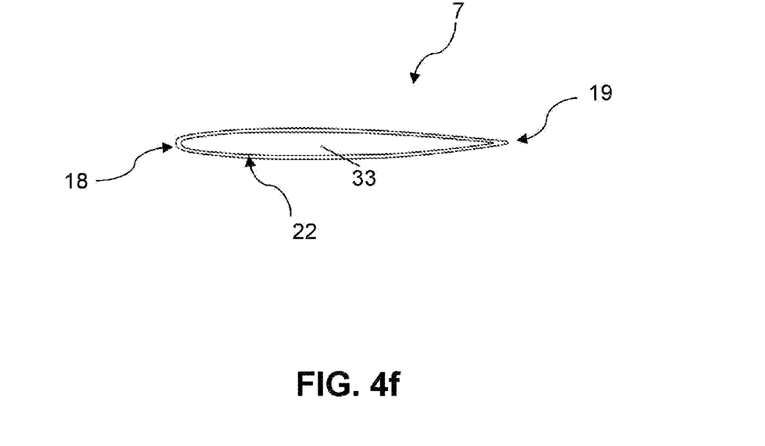
FIG. 4f is a section view along the section G-G of FIG. 3 according to the first embodiment.

The section D-D is located at a height between 5% and 30% of the height of the aerodynamic profile structure 20 (said height being measured by projection onto the axis of setting Y and extending from the interface between the blade root part 24 and the airfoil part all the way to the tip of the blade 7).

Going back up toward the blade 7 tip, the inner structure of the blade 7 must lose stiffness, to follow the tapering aerodynamic profile but also to retain an acceptable stress hierarchy in the event of impact. This entails a decrease in the thickness of the branches 29 but also a decrease in the thickness L2. This is why, starting from the section D-D, at least two additional filling pieces 32 are placed between the spar reinforcement 26 and each opposing skin 22, at the level of the pressure face I and of the suction face E of the blade 7. In addition, the length L1 of the interlinked area 27 increases between the sections C-C and D-D in order to retain the filling pieces 31 under centrifugal forces by restriction of the section.

Figure 5A:
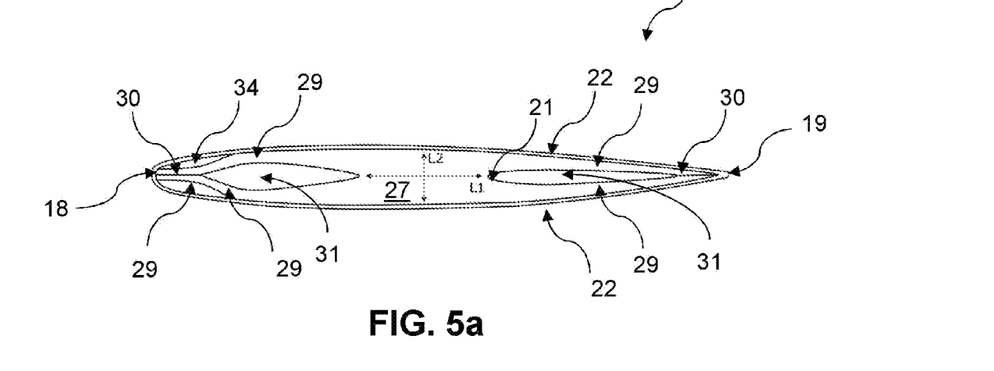
FIG. 5a is a section view along the section C-C of FIG. 3 according to a second embodiment.
Figure 5B:
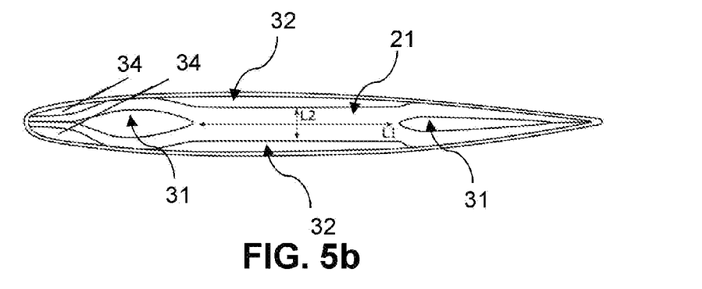
FIG. 5b is a section view along the section D-D of FIG. 3 according to the second embodiment.
Figure 5C:
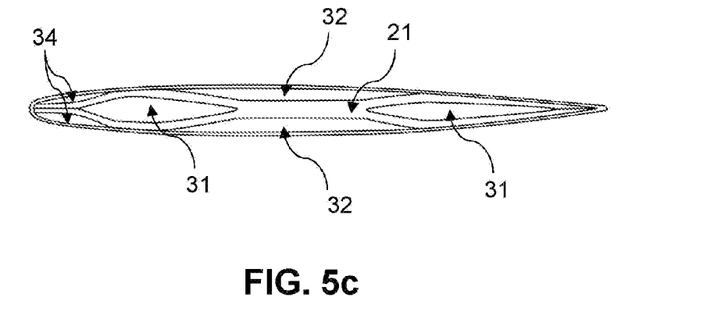
FIG. 5c is a section view along the section E-E of FIG. 3 according to the second embodiment.
Figure 5D:
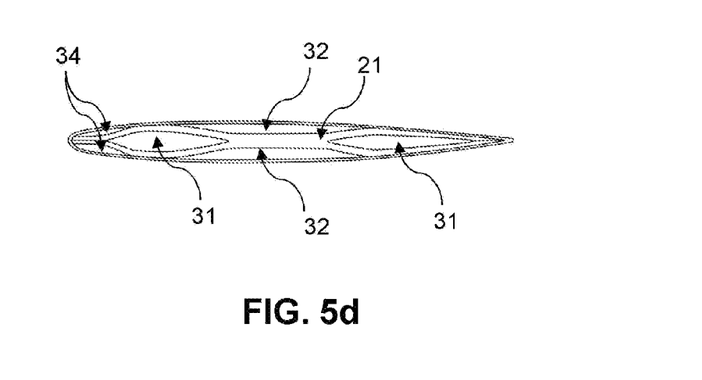
FIG. 5d is a section view along the section F-F of FIG. 3 according to the second embodiment.

The section F-F is located at a height between 60% and 85% of the height of the aerodynamic profile structure 20.

Between the section D-D and the section F-F (FIGS. 4c, 4d and 4e), the general structure of the blade 7 does not change. Only the geometrical dimensions vary. All the dimensions (particularly the length L1, the thickness L2 or else the chord) gradually decrease along the radial direction of the section D-D in the direction of the section F-F for the reasons already described.

Beyond the section F-F, starting from a lower limit equal to approximately 85% of the height of the aerodynamic profile structure 20 and all the way to the tip of the blade 7, the blade 7 can be devoid of any spar reinforcement 26. The cavity delimited by the spar reinforcement 26 (lower radial limit), the skins 22 and the blade 7 tip can then be filled by an additional filling piece 33, which may comprise one of the materials listed above for the filling pieces 31. Preferably the additional filling piece 23 does not completely open onto the blade 7 tip (no full contact with the skins 22 at the level of the blade 7 tip) in order to fashion a small space filled by the resin at the time of injection to ensure the sealing of the cavity.

The blades 7, the sections of which are illustrated in FIGS. 4a-4f and 5a-5d, therefore comprise four types of configuration (a first in the blade root part 24 (between the sections A-A and B-B), a second in the lower portion of the airfoil part 25 between the sections C-C and D-D, comprising the filling pieces 31), a third in a central portion of the airfoil part 25 (between the sections D-D and F-F, further comprising the additional filling pieces 32) and a fourth in the blade 7 tip (beyond the section F-F comprising the additional filling piece 33). This is however not limiting, the blade 7 being able to only comprise the first and second configuration over its entire height, or else solely the first configuration, the second configuration or the third configuration.

For example, it is possible to dispense with the additional filling piece 33 at the blade 7 tip and to bring the spar reinforcement 26 back up to the blade 7 tip or, in a variant, to stop the non-interlinkings level with the section F-F and to continue with a fiber reinforcement devoid of any non-interlinking between the section F-F and the blade 7 tip.

According to yet another variant, an airfoil part 25 could comprise only a single configuration corresponding to the sections of type C-C, D-D or G-G.

Figure 7:
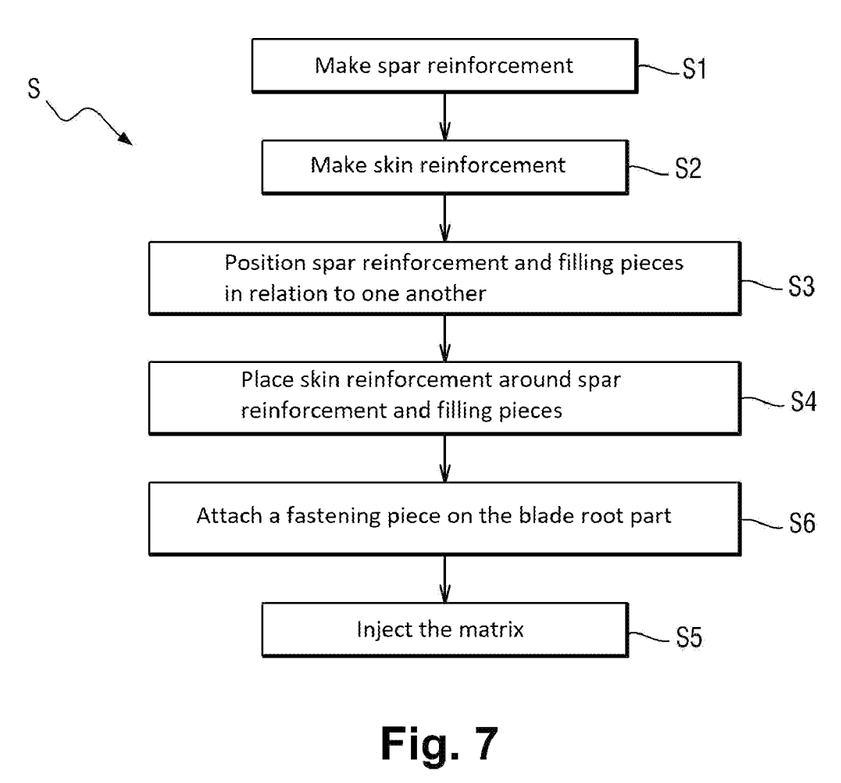
FIG. 7 is a flow chart of steps of a method for manufacturing a blade according to an embodiment.
Figure 8A:
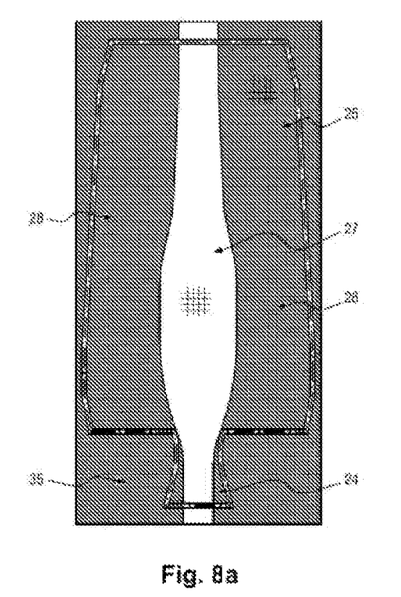
FIG. 8a illustrates an example of a fiber preform intended to form a fiber reinforcement of a spar of a blade in accordance with an embodiment before trimming and shaping, on which the trimming of the preform is indicated in broken lines.
Figure 8B:
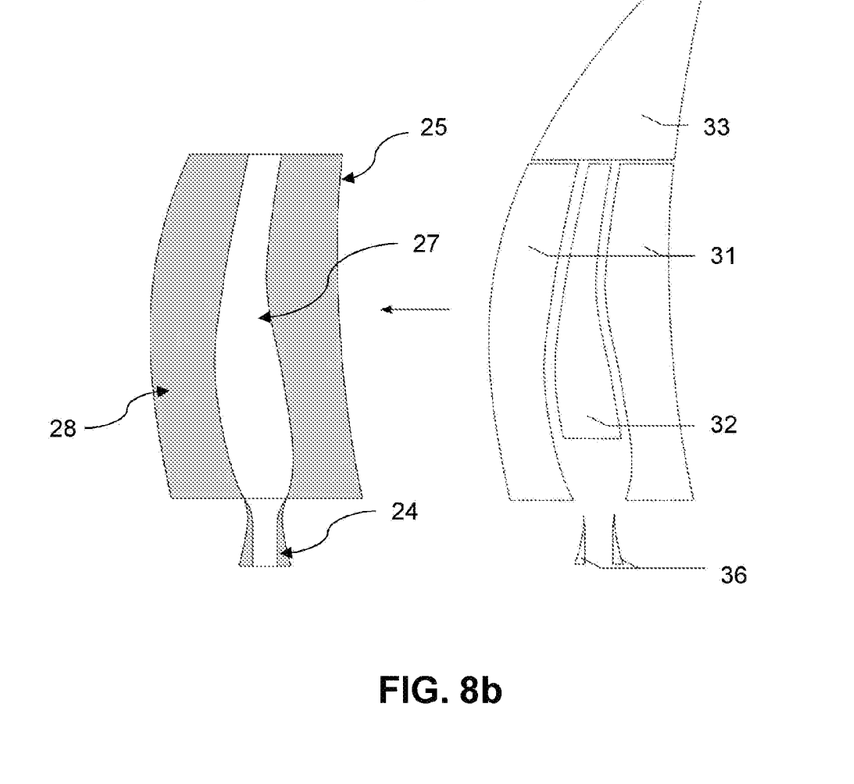
FIG. 8b illustrates the assembly of the fiber preform of FIG. 8a with an example of a fiber preform intended to form a fiber reinforcement of an aerodynamic structure into which filling pieces have been previously inserted.
Figure 9:
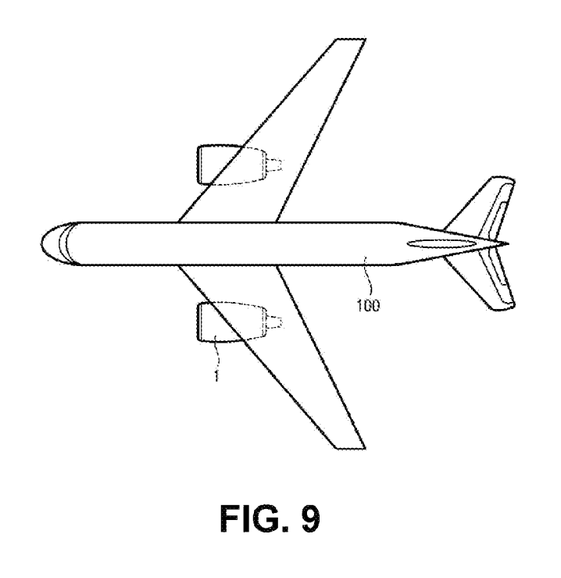
FIG. 9 illustrates an example of an aircraft comprising engines in accordance with an embodiment.

FIGS. 7, 8a and 8b illustrate steps of a method S for manufacturing a fan blade 7 in accordance with a possible embodiment.

In a step S1, the spar reinforcement 26 is produced by three-dimensional weaving on a jacquard-type loom. During the weaving, bundles of warp tows (or warp tows) are disposed in several layers of several hundred tows each. Weft tows T are interlaced with the warp tows C in such a way as to link the different layers of warp tows C to one another.

The spar reinforcement 26 is woven flat.

In the illustrated example, the three-dimensional weaving is an "interlock" weave. The term "interlock" denotes a weave in which each layer of weft tows interlinks several layers of warp tows, with all the tows of a same weft column having the same movement in the weave plane.

Other types of known three-dimensional weaving may be used, such as in particular those described in the document WO 2006/136755.

The step of weaving the rough spar reinforcement 26 (or fiber preform) successively comprises the weaving of a provisional fiber reinforcement portion 35 (which will be removed later during the manufacturing method), the weaving of the blade root part 24 and the weaving of the airfoil part 25. The provisional fiber reinforcement portion 35 is woven by interlacing all the warp tows C required for the production of the spar reinforcement 26. Once the weft column has reached a predetermined width, the airfoil part 25 is woven. In this way, the blade root part 24 comprises warp threads which extend inside the airfoil part 25.

To form the non-interlinked areas 28, the warp tows of two successive layers are not linked at two distinct and separate places by the weft tows (which will form the interlinked area 27), as schematized in FIG. 6a. One thus obtains the central interlinked area 27, and the two non-interlinked areas 28 forming the four branches 29. These four branches 29 can then be moved further apart to form ribs in the blade root part 24 (FIG. 6b).

The embodiment of the blade root part 24 therefore judiciously uses the possibilities of non-interlinking of a woven and interlocked fiber preform. Consequently, the manufacturing method requires few operations by comparison with the use of a laminate composite material, which requires ply-by-ply lay-up. In addition, the use of an interlock woven composite material also makes it possible to avoid the presence of weak interfaces in the structural part of the airfoil, thus minimizing the risk of damage by peeling.

The provisional fiber reinforcement portion 35 is then cut out in order to be eliminated (FIG. 8a). The trimming and cutting of the blade root part 24 and of the airfoil part 25 can be done by pressurized water jet.

The spar reinforcement 26 is then shaped (three-dimensional deformation to give it a corkscrew shape, which will be its final shape) (see the spar reinforcement 26 on the left in FIG. 8b).

During a step S2, which may be simultaneous, successive or prior to the step S1, the skin reinforcement 23 is produced. As indicated above, the skin reinforcement 23 may comprise an arrangement of woven, braided, knit or laminate fibers.

During a step S3, the spar reinforcement 26 and the filling pieces 31 are positioned with respect to one another (right-hand part of FIG. 8b). Where applicable, temporary filling pieces 36, particularly made of foam, rendered non-adhesive by chemical treatment (mold release product) and/or addition of Teflon at the surface, may also be put in place to simplify the shape of the injection mold and/or facilitate the mold release operation. Such filling pieces 36 can in particular be used in the root part, in each non-interlinked area 28. These temporary filling pieces 36 are removed after injection.

During a step S4, the skin reinforcement 23 is placed around the spar reinforcement 26, the filling pieces 31 and where applicable the temporary filling pieces 36, such that the blade root part 24 is found outside the skin reinforcement 23 and the airfoil part 25 is found inside the skin reinforcement 23.

During a step S5, the assembly thus obtained, formed of the spar reinforcement 26, the skin reinforcement 23 and the filling pieces 31, 32, 33 and/or 34, is placed in a mold having a cavity having the shape of the molded final part (namely the blade 7) and plastic (the "matrix" of the aerodynamic profile structure 20 and of the spar 21) is injected into the mold in such a way as to impregnate the two fiber reinforcements. The injection of plastic can be done by an injection technique of RTM or VARRTM type. The injected plastic is for example a thermosetting liquid composition containing an organic precursor of the material of the matrix. The organic precursor usually takes the form of a polymer, such as a resin, where applicable diluted in a solvent.

In a manner known per se, the plastic is heated in such a way as to cause a curing of the plastic, for example by crosslinking. For this purpose, the mold is placed in an oven. The part obtained is then unmolded then, optionally, trimmed by machining in order to remove the excess lengths and obtain a part having the desired shape, despite any possible shrinkage of the fibers of the reinforcements during the curing of the plastic.

Optionally, the temporary filling pieces 36 are then removed.

During a step S6, a fastening piece 9 is added on and attached to the spar reinforcement 26. It can in particular be obtained by machining in order to form the cavity, the shape and dimensions of which are those of the blade root part 24.

Optionally, the fastening piece 9 can be made of two parts in order to be able to be added on and attached around the blade root part 24 using two dedicated bushes, for example by interference fitting, screwing, welding or else using a clamp. The step S6 of attaching the fastening piece 9 can therefore be done before or after the injection (step S5). When the fastening piece 9 is attached before injection to the blade root part 24, the temporary filling pieces 36 are not necessary at the blade 7 root.

Conventional end-of-process operations on the blade 7 such as machining touch-ups, the bonding of anti-rub strips, the insertion of a de-icing system or else the addition of a metallic leading edge shield 18 can then be executed.

The invention claimed is:

1. A blade comprising a structure made of composite material comprising:

an aerodynamic profile structure comprising two skins facing one another, the skins comprising a first fiber reinforcement densified by a matrix; and a spar comprising a second fiber reinforcement obtained by three-dimensional weaving and densified by the matrix, said spar comprising a blade root part extending outside the aerodynamic profile structure and an airfoil part disposed inside the aerodynamic profile structure between the two skins;

wherein, within the blade root part, the second fiber reinforcement comprises an interlinked area and at least two non-interlinked areas extending radially from the interlinked area so as to form at least four distinct branches.

2. The blade as claimed in claim 1, wherein, within the blade root part, the branches of the non-interlinked area are contained in a circle centered on an axis of setting of the blade.

3. The blade as claimed in claim 1, further comprising a fastening piece comprising a wall delimiting a cavity configured to at least partly receive the blade root part, the wall of the fastening piece comprising at least four depressions configured to each receive, with adjustment, a branch of the second fiber reinforcement.

4. The blade as claimed in claim 3, wherein, in a portion of the blade root part which protrudes from the fastening piece, a diameter of the circle decreases towards the airfoil part.

5. The blade as claimed in claim 1, wherein, within the blade root part, the interlinked area has a first dimension, along an axis substantially parallel to a chord of the blade, which is constant over a height of the blade root part, and a second dimension, along a tangential axis which is substantially perpendicular to a chord of the blade, which is constant over the height of the blade root part.

6. The blade as claimed in claim 1, wherein the airfoil part has a lower portion adjacent to the blade root part, the non-interlinked area and the interlinked area of the second fiber reinforcement extending all the way into the lower portion, the blade further comprising at least two filling pieces made of a material including inner cavities, each filling piece being mounted within a corresponding non-interlinked area.

7. The blade as claimed in claim 6, wherein the interlinked area has a first dimension, along an axis substantially parallel to a chord of the blade, which is greater in the lower portion of the airfoil part than in the blade root part.

8. The blade as claimed in claim 7, wherein the first dimension gradually increases within the lower portion of the airfoil part towards a tip of the blade and wherein, within the lower portion of the airfoil part, the interlinked area has a second dimension, along a tangential axis which is substantially perpendicular to a chord of the blade, which decreases towards a tip of the blade.

9. The blade as claimed in claim 6, wherein the lower portion of the airfoil part further comprises at least two additional filling pieces made of a material including inner cavities, each additional filling piece being mounted between the interlinked area and a corresponding skin.

10. The blade as claimed in claim 6, wherein the interlinked areas within the airfoil part extend all the way to a part of the skins which defines at least one of a leading edge and a trailing edge of the blade.

11. The blade as claimed in claim 6, wherein the airfoil part further includes an upper portion comprising the blade tip, the upper portion of the airfoil part further comprising at least one additional filling piece made of a material including inner cavities, the upper portion of the airfoil part being devoid of any second fiber reinforcement.

12. The blade as claimed in claim 6, wherein the airfoil part further includes an upper portion comprising the blade tip, the upper portion of the airfoil part solely comprising the second fiber reinforcement.

13. A fan comprising a fan disc and blades as claimed claim 1.

14. The blade as claimed in claim 3, wherein the fastening piece is metallic.

15. A method for manufacturing a blade comprising the following steps:

three-dimensional weaving of a second fiber reinforcement of a spar of the blade, wherein the second fiber reinforcement comprises, an interlinked area and at least two non-interlinked areas extending radially from the interlinked area so as to form at least four distinct branches;

producing a first fiber reinforcement of an aerodynamic profile structure of the blade so as to form two skins of an aerodynamic profile structure, the skins facing one another;

inserting the second fiber reinforcement between the two skins of the first fiber reinforcement such that a blade root part of the spar is located on the outside of the first fiber reinforcement and an airfoil part of the spar is located inside the first fiber reinforcement between the two skins; and placing the assembly formed by the first fiber reinforcement and the second fiber reinforcement into a mold and injecting a matrix into the assembly such as to obtain the blade.

16. The method as claimed in claim 15, further comprising positioning at least one filling piece made of a material including inner cavities with respect to the first fiber reinforcement prior to placing the assembly into the mold.

17. The method as claimed in claim 15, wherein the first fiber reinforcement is obtained by three-dimensional weaving.

* * * * *